United States Patent [19]

Weyand

[11] Patent Number: 4,946,131
[45] Date of Patent: Aug. 7, 1990

[54] ARRANGEMENT FOR DAMPING LINEAR MOVEMENTS

[75] Inventor: Manfred Weyand, Viersen, Fed. Rep. of Germany

[73] Assignee: Sempell AG, Fed. Rep. of Germany

[21] Appl. No.: 424,268

[22] PCT Filed: Apr. 22, 1988

[86] PCT No.: PCT/EP88/00343
§ 371 Date: Oct. 23, 1989
§ 102(e) Date: Oct. 23, 1989

[87] PCT Pub. No.: WO88/08936
PCT Pub. Date: Nov. 17, 1988

[30] Foreign Application Priority Data
May 9, 1987 [DE] Fed. Rep. of Germany ....... 3715562

[51] Int. Cl.[5] .......................... F16F 9/30; F16K 47/00
[52] U.S. Cl. ......................................... 251/48; 74/25;
74/89.15; 74/424.8 VA; 188/268; 251/229;
251/264
[58] Field of Search ............... 188/268, 290, 293, 296;
251/48, 51, 52, 54, 55, 229, 264, 265, 266, 267;
74/3.5, 25, 89, 89.15, 424.8 VA; 16/51, 82

[56] References Cited

U.S. PATENT DOCUMENTS

| 957,311 | 5/1910 | Davis et al. | 251/54 |
| 2,419,372 | 4/1947 | Schneider | 188/296 |
| 4,072,163 | 2/1978 | Byrnes | 251/54 |
| 4,139,016 | 2/1979 | Byrnes | 251/54 |
| 4,364,541 | 12/1982 | Chabat-Courrede et al. | 251/54 |
| 4,402,335 | 9/1983 | Kemmler | 251/48 |

FOREIGN PATENT DOCUMENTS

845567 8/1939 France ............................. 188/290
2389047 11/1978 France .

Primary Examiner—George L. Walton
Attorney, Agent, or Firm—Fred Philpitt

[57] ABSTRACT

Arrangement for damping linear movements intended for use on a safety valve. An arrangement for damping linear movements of the valve spindle (10) of a safety valve of small amplitude and high frequency comprises two counter-rotatable damping parts (18, 36) with intermeshing wall (22, 24, 32) which delimit narrow working gaps (44, 46) containing a high-viscosity silicone grease. The linear intake movement is converted by a threaded drive (12, 40) into a rotary movement during which the silicone grease (47) in the working gaps (44, 46) is subjected to shear forces and eliminates the unwanted energy by virtue of its internal friction.

8 Claims, 1 Drawing Sheet

ARRANGEMENT FOR DAMPING LINEAR MOVEMENTS

DESCRIPTION

The invention relates to an arrangement for damping linear movements for use on a safety valve.

A damping arrangement of this type is described in FR-A No. 2 389 047.

In the latter, two cup-shaped damping parts, which together define a working gap filled with a viscous medium, have a fixed, predetermined axial position.

If one were to use a damping arrangement of this type on a safety valve, then the damping would not be satisfactory, since the damping comes into action reliably on the one hand already at very small opening displacements of the closure part, irrespective of manufacturing tolerances, which result for example from the machining of the sealing surfaces. Also, in safety valves of this type, the force acting on the valve spindle also varies very considerably depending on the opening displacement and the known damping arrangement thus cannot damp oscillations, which occur in the immediate vicinity of the closing position, as well as other oscillations which are set up around a partly open position.

The present invention therefore intends to develop an arrangement for damping linear movements so that the damping characteristics can be adjusted precisely in a simple manner.

This object is achieved according to the invention by a damping arrangement C.

Advantageous developments of the invention are described in the Sub-claims.

In another damping arrangement, the value of the displacement-independent component of the damping can be adjusted in a very simple manner. One can thus adjust the damping properties of the safety valve easily at the installation point taking into consideration the lengths of the pipe sections connected to the safety valve at the inlet side and the outlet side.

In a damping arrangement according to another embodiment, a small displacement-dependent component of the damping can be adjusted, this component being progressive or degressive according to the pitch of the support-screw coupling.

The development of the invention according to another embodiment is an advantage with regard to the lowest possible abrasive nature of the viscous medium.

The invention will be described in detail hereafter by means of embodiments, referring to the drawings, in which:

FIG. 1 shows the upper end of a valve spindle 10, which is provided with a threaded section 12. The valve spindle is guided on a valve housing by way of sliding packings (which are not shown in detail) and at its lower end not shown in the drawing supports a closure member, which co-operates with a valve seat likewise not shown.

Figure 1:
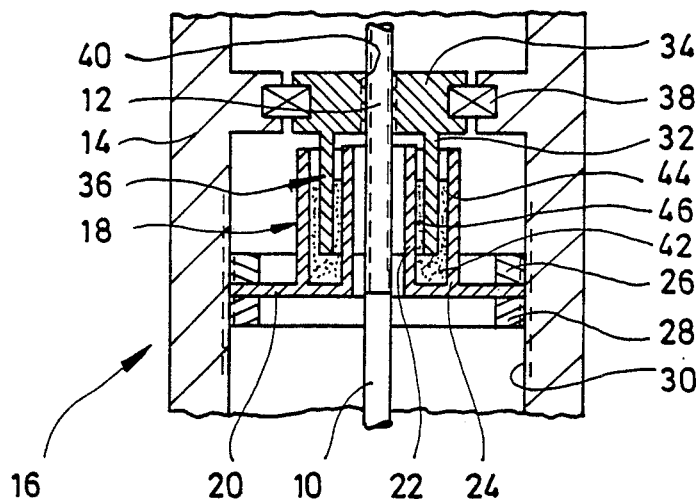
FIG. 1 is an axial section through a damping arrangement for a valve spindle operating with a viscous medium.

Of the valve housing, only an upper end section of the housing 14 is shown, which receives a damping arrangement acting on the valve spindle 10 and designated generally by the reference numeral 16.

Belonging to the damping arrangement 16 is a lower damping part 18, which comprises a transverse base 20 and two working walls 22, 24 coaxial with respect to the axis of the valve spindle 10.

The base 20 is clamped between two threaded rings 26, 28, whereof the external threads engage in an internal thread 30 of the end section of the housing 14.

Engaging between the working walls 22, 24 in the manner of a comb is a further working wall 32, which is supported by a hub section 34. The components 32 and 34 together form an upper damping part 36.

The damping part 36 is mounted by way of an axial/radial bearing 38 on the end section of the housing 14.

The hub section 34 is provided with an internal thread 40, which co-operates with the threaded section 12 of the valve spindle 10.

The annular space defined by the working walls 22, 24 is filled with a highly viscous silicone grease 42. The latter contains graphite as a filler component or as the exclusive filler. The level of the silicone grease 42 extends above the lower edge of the suspended working wall 32 of the upper damping part 36.

The inner surface of the working wall 24 and the outer surface of the working wall 32 as well as the inner surface of the working wall 32 and the outer surface of the working wall 22 form two pairs of working surfaces, between which the annular working gaps 44, 46 are located. A thin layer of silicone grease 42 is located in these working gaps. The thickness of the working gaps is illustrated in an exaggerated manner in the drawing; in practice the thickness of the gap amounts to approximately 0.1 to approximately 1 mm.

If the valve spindle 10 is moved in a linear manner, for example due to pressure surges acting on the closure member in the pipe to be protected, then the linear movement of the valve spindle 10 is converted by a movement conversion transmission, which is formed by the co-operating threads 12 and 40 as well as the axial/radial bearing 38, into a pure rotary movement. This rotary movement leads to shearing of the silicone grease 42 located in the working gaps 44, 46, and due to the inner friction of this highly viscous medium, the movement of the valve spindle 10 is damped.

It can be seen that irrespective of the distance covered by the valve spindle 10, one has exactly the same working gap geometry, so that the damping of the movement takes place independently of the displacement.

Figure 2:
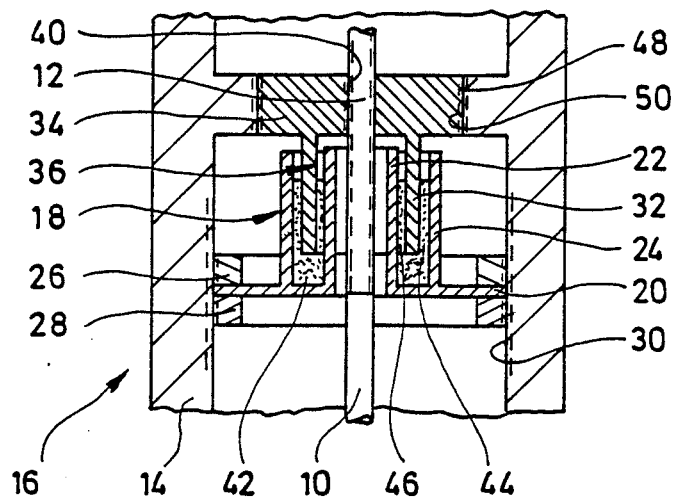
FIG. 2 is a similar sectional view to FIG. 1, in which a modified damping arrangement is illustrated.

The embodiment illustrated in FIG. 2 corresponds largely to that according to FIG. 1, so that corresponding components have again been given the same reference numerals and are not described again in detail hereafter.

The upper damping part 36 is now not mounted by way of an axial/radial bearing, but by way of an external thread 48 on the hub section 34 and a matching thread 50 integral with the housing, on the end section of the housing 14. Compared with the treaded section 12 of the valve spindle 10, the threads 48 and 50 have a small pitch so that for a given axial movement of the valve spindle 10, one obtains only a small axial adjustment of the upper damping part 36, thus also a small variation of the penetration depth of the working wall 32 into the silicone grease 42. In this case, this variation of the penetration depth may be positive or negative, according to whether the pair of threads 48, 50 has the same direction of rotation as the pair of threads 12, 40 or the opposite direction of the rotation. The extent of the displacement-dependent portion of the damping can be adjusted by way of the pitch of the threads 48, 50.

In the case of both above-described damping arrangements, the intensity of the basic damping can be predetermined by adjusting the lower damping part 18, for which purpose the threaded rings 26, 28 are appropriately screwed on the internal thread 30 of the end section of the housing 14.

Both above-described damping arrangements operate completely without static friction. One thus has effective damping even for low oscillation amplitudes, damping taking place in a speed-dependent manner.

I claim:

1. An arrangement for damping linear movement for use on a safety valve, said safety valve including
   (a) a housing (14),
   a valve shaft (10) to be connected to a valve element to be damped,
   (c) an outer cup-shaped damping part (18) mounted within said housing (14),
   (d) a rotary inner cup-shaped damping part (36) located within said housing (14) and extending into said damping part (18) from above, the outer surface of said damping part (36) together with the inner surface of said damping part (18) defining a working gap in which a viscous medium (42) is located,
   (e) a movement-conversion transmission means (12, 38, 40) for converting the linear movement of the valve shaft (10) into a rotary movement of said rotary inner damping part (36), and
   (f) means for adjusting the axial relative positions of said damping part (18) and said rotary inner damping part (36) to thereby adjust the depth of immersion of the said rotary damping part (36) in said damping part (18) and to thereby control the dampening intensity for the valve element.

2. A damping arrangement according to claim 1, wherein said damping part (18) is supported on the housing (14) by way of a threaded connection (26 to 30).

3. A damping arrangement according to claim 1 wherein the rotary damping part (36) is supported on the housing (14) by that of a threaded connection (48, 50).

4. A damping arrangement according to claim 1 wherein said movement-conversion transmission means comprises a thread (12) formed on the axially moveable valve shaft (10), which is fixed in the angular direction, and a thread (40) engaging therewith and connected to the rotary damping part (36).

5. A damping arrangement according to claim 1 wherein the movement-conversion transmission comprises a helical cam groove formed in the spindle and a cam cooperating therewith and connected to the rotary damping part (36).

6. A damping arrangement according to claim 1 wherein the viscous medium is a silicone grease containing a filler, the filler consisting at least partly of graphite.

7. A damping arrangement according to claim 1 wherein the viscosity of the viscous medium does not vary substantially over a large temperature range.

8. A damping arrangement according to claim 1 wherein the working gaps between the damping parts (18, 36), in which the viscous medium (42) is located, have a width of less than approximately 1 mm.

* * * * *